Oct. 26, 1971     D. M. GETTIG ET AL     3,615,051
METHOD AND APPARATUS FOR THE COMBUSTION OF FUELS
Filed May 29, 1968
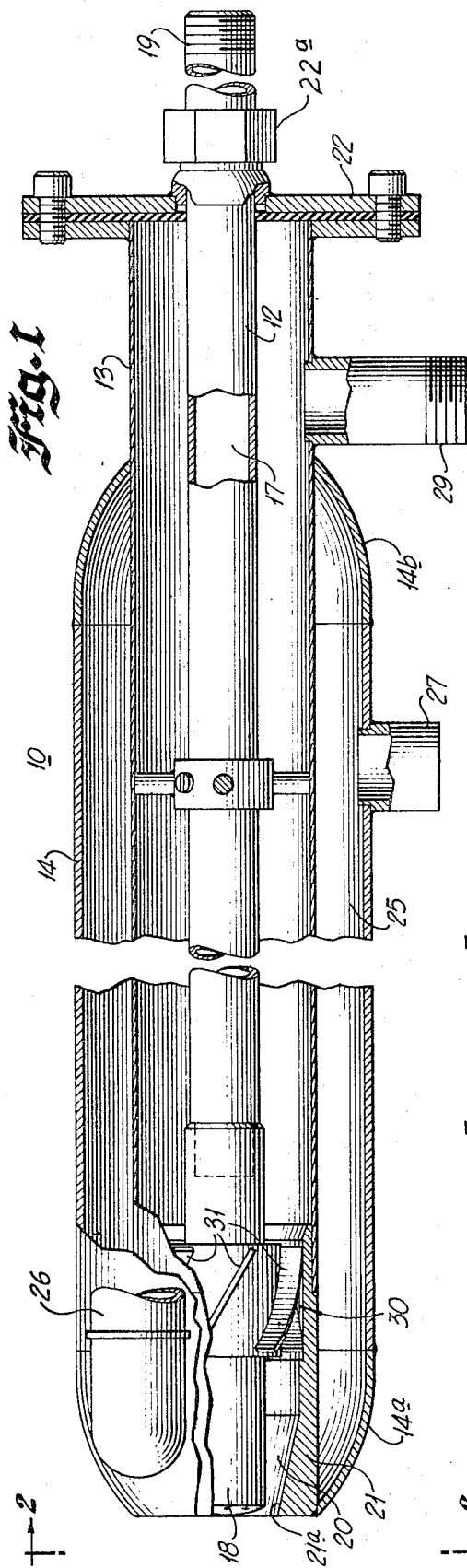
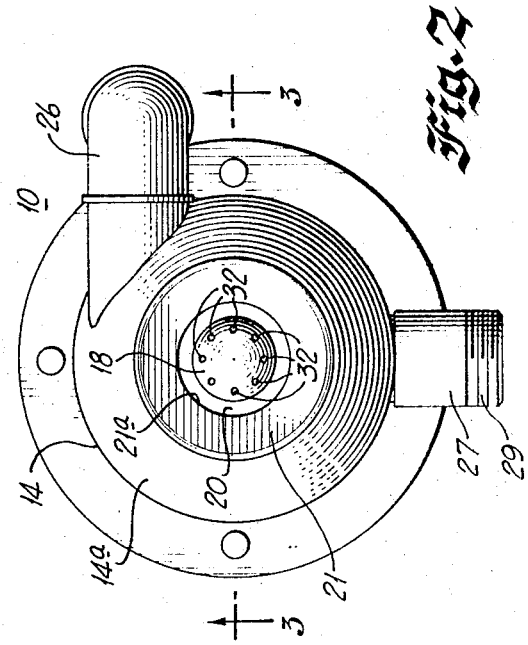
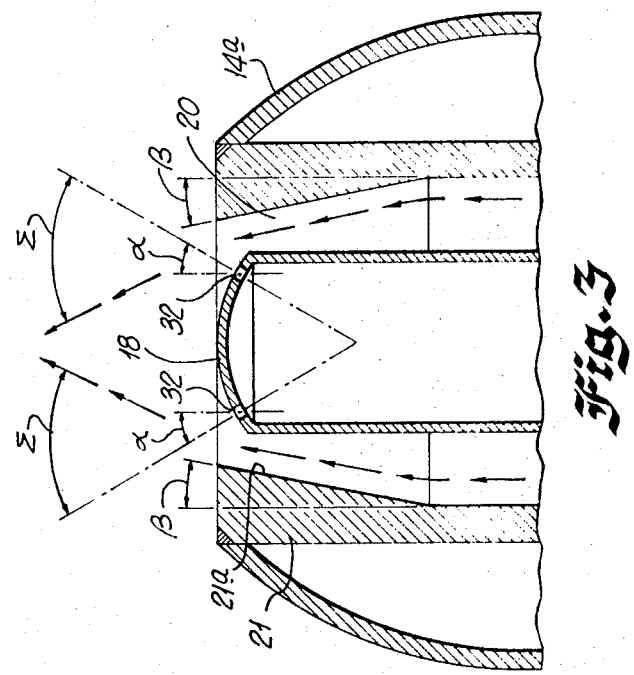
INVENTORS
DONALD M. GETTIG AND
EDWARD A. GROBEL
by Mason, Kolehmainen, Rathburn & Wyss
ATTORNEY.

United States Patent Office 3,615,051
Patented Oct. 26, 1971

3,615,051
METHOD AND APPARATUS FOR THE COMBUSTION OF FUELS
Donald M. Gettig, Elk Grove Village, and Edward A. Grobel, Mundelein, Ill., assignors to Chemetron Corporation, Chicago, Ill.
Filed May 29, 1968, Ser. No. 733,018
Int. Cl. A01n 17/02
U.S. Cl. 239—8                                  3 Claims

ABSTRACT OF THE DISCLOSURE

A fuel burner for burning large volumes of combustible fluid fuels is formed of three concentric tubes forming an inner chamber for the conveyance of the fuel, an intermediate annular chamber for conveying both oxidizing and atomizing gas, and an outer annular chamber for coolant. The fuel is directed from the nozzle in streams generally outwardly, and the oxidizing and atomizing gas is given a violent whirling motion which intersects the fuel streams at an angle so as to completely atomize the fuel and to supply stoichiometric volumes of oxygen. The method includes the steps of spraying fuel in streams from the end of a nozzle and of intersecting the streams with a swirling flow of oxidizing and atomizing gas in sufficient volume to provide a stoichiometric volume of oxygen and at the same time to atomize the fuel.

---

This invention relates in general to a method and apparatus for burning fluid fuels. More particularly, this invention relates to a method and apparatus for burning large volumes of fluid fuels at high velocities such as for melting and refining scrap metals in a manner obtaining rapid and complete combustion of the fuels.

Burners having a capacity of one million to six hundred million B.t.u.'s per hour wherein temperatures over 3000° F. are maintained for substantial periods of time have found wide use in various types of furnaces such as the open hearth, the reverberatory type, the electric furnace and the basic oxygen furnace which is being employed to a greater degree because of its fast rate of steel making. To maintain a high degree of steel production in the basic oxygen furnace it is necessary to have a source of heat capable of preheating and melting large volumes of scrap metal, iron ore and other solid, ferrous and non-ferrous bearing scrap materials. Many of the commercially available burners operating under high volumes and B.t.u. outputs do not provide complete atomization of a liquid fuel and complete combustion thereof by the oxidant. Moreover many commercially available burners are not capable of preheating and melting the large amounts of scrap metal required for profitable operation of the basic oxygen furnace while burning the fuel in an efficient manner. Further, many burners of this type concerned with in this invention are of the pre-mix type presenting explosion hazards and requiring close regulation of fuel to air mixtures for operable flame characteristics. Many of the burners employed in steel making processes are complicated in design and costly to manufacture.

It is therefore an object of the present invention to provide new and improved apparatus for burning fluid fuels in large quantities and at high flow rates.

Another object of the present invention is to provide a new and improved apparatus for burning fluid fuels which overcomes the above mentioned difficulties.

Yet a further object of the present invention is to provide a new and improved method for burning fluid fuels in large quantities and at high flow rates.

Yet another object of the present invention is to provide a new and improved method for burning fluid fuels which overcomes the above mentioned difficulties.

Further objects and advantages of the present invention will become apparent as the following description proceeds and the features of novelty which characterize the invention will be pointed out with particularity in the claims annexed to and forming a part of this specification.

In accordance with these and many other objects of the present invention there is provided an apparatus for burning large volumes of combustible fluid fuels including three concentric tubular shells. The first shell defines a tubular chamber for supplying a first fluid such as fuel to the nozzle. An annular concentric second chamber provides for the supply of a second fluid such as combined oxidizing and atomizing gas. An annular concentric third chamber provides for the supply of coolant. The fuel is discharged in a number of streams diverging outwardly to define outwardly directed streams of fluid, and the fuel streams are intercepted by inwardly directed swirling gases to provide complete atomizing and oxidizing of the fuel.

In accordance with another feature of the present invention, the coolant is introduced into the cooling chamber tangentially to provide a swirling movement to the coolant so as to scrub the surfaces of the cooling chamber and provide very effective cooling of the burner.

The present invention is also directed to an improved method for burning large volumes of liquid fuel and includes the steps of spraying the liquid fuel in streams from the end of a nozzle and intercepting the streams with a swirling flow of oxidizing and atomizing gas in sufficient volume to provide a stoichiometric volume of gas and at the same time to atomize the liquid fuel.

For a better understanding of the present invention reference may be had to the accompanying drawings wherein:

FIG. 1 is a fragmentary cross sectional view of a burner according to the present invention;

FIG. 2 is an end view of the burner of FIG. 1, taken along line 2—2 of FIG. 1; and FIG. 3 is a fragmentary cross sectional view, somewhat schematic, of the burner tip taken along line 3—3 of FIG. 2 illustrating the flow geometry of the burner.

Referring now to the drawings, there is provided an improved burner assembly 10 defined by three concentrically spaced shells or tubes 12, 13 and 14. The inner shell 12 defines a tubular first chamber 17 having a fuel nozzle 18 at one end and provided with a fuel inlet 19 at its other end for supplying fluid fuel such as liquid, gaseous or solid fuel in suspension.

The intermediate shell 13, concentric with the shell 12 defines an annular second chamber 20 open adjacent the fuel nozzle 18 to define a gas nozzle 21. The other end of the shell 13 is closed by a suitable cover or plate 22 through which extends the shell 12. A packing gland 22a forms a seal between the plate 22 and the inner shell 12 and provides longitudinal adjustment of the inner shell 12 with respect to the intermediate shell 13.

The outer shell 14 is spaced from the intermediate shell 13 but contoured inwardly at each end, as at 14a and 14b, to define an annular third chamber 25 forming an enclosed coolant jacket around the intermediate shell from the tip end rearwardly a major portion of the length of the intermediate shell. In accordance with another aspect of the present invention, a coolant inlet 26 extends tangentially into the forward contoured portion 14a of the shell 14, and a spaced coolant outlet 27 provides for the discharge of coolant therefrom. The tangential direction of the coolant inlet 26 provides for a tangential introduction of coolant, such as cooling water, at the forward end of the cooling chamber 25 so as to provide a swirling and scrubbing motion to the coolant thereby to provide maximum effective cooling of the burner assembly 10.

In accordance with one feature of the present invention, both the atomizing gas and the oxidizing gas are introduced to the gas chamber 20 through a gas inlet 29, passing past a swirling mechanism 30 in the form of helically shaped vanes 31 extending between the inner and intermediate shells 12 and 13. The vanes 31 impart a strong swirling action to the gas stream surrounding the nozzle. Moreover the tip end of the intermediate tube is contoured inwardly, as at 21a to deflect the swirling gas stream inwardly so that the gas stream intersects the fuel streams at an angle.

Referring now to FIG. 3, the fluid passing through the fluid chamber 17 is discharged from the fuel nozzle through a number of apertures 32 each diverging outwardly from the axis of the burner as indicated by the angle $\alpha$, FIG. 3. Since the inner tip surface 21a of the gas nozzle 21 is tapered inwardly by an angle $\beta$, FIG. 3, the gas flow from the gas chamber 20 will be directed inwardly, thus intersecting the fluid streams at an angle $\Sigma$, FIG. 3 in the range of 45° to 90°. Since a substantial pressure drop will normally occur across the apertures 32, liquid fuel passing through the aperture may tend to partially vaporize thus promoting atomization of the fuel.

In one particular embodiment it had been found that when using a liquid fuel such as fuel oil, providing an outward deflection of the multiplicity of fluid streams from the apertures 32 to diverge approximately 15° from the axis of the burner, angle $\alpha$, FIG. 3; and having a taper $\beta$ to the inner surface 21a of the gas nozzle 21 of 11°, the swirling gas stream intercepts the fuel streams causing a shearing effect between the two streams which produces an intimate mixing and atomization of the oil. The oxidizing and atomizing gas may consist of pure oxygen, oxygen enriched air, or an oxygen-air-fuel combination depending upon the basic burner usage and application design.

If desired the helical vanes 31 may be made adjustable as to angle so that a strong but adjustable centrifugal action is imparted to the gas stream. Then as the oxidizing and atomizing stream approaches the nozzle it converges against the fuel streams so as to shear the fuel streams with the oxidizing and atomizing gas. The violent centrifugal swirling action of the gas permits a maximum of oxidant to fuel mixing with surfaces contact and diffusion of the fuel and the oxidant. A much more effective hotter flame than in a laminar stream type of flame is achieved.

From the above description the improved method of burning large volumes of liquid fuel is believed clear. However briefly the method according to the present invention comprises the steps of spraying the liquid fuel into streams from the apertures 32 so as to diverge outwardly and intersecting the streams of liquid fuel with a swirling flow of oxidizing and atomizing gas from the gas nozzle 21, directed inwardly. All of the necessary gas is supplied through the nozzle 21 required for stoichiometric combustion of the fuel and to obtain complete atomization of the liquid fuel. Excellent results are obtained with the fluid streams diverging outwardly between 10° and 60° from the axis of the burner, and the gas intersecting the liquid streams at an angle in the range of 45° to 90°.

Although the above embodiment has been described as used with a liquid fuel, it is understood that the burner apparatus 10 may readily be adapted to gaseous fuels.

Moreover, since the products of the two inner chambers are completely intermixed and atomized, either of the chambers may convey fuel and the other convey the atomizing and oxidizing medium. The flame characteristics may be varied be repositioning the swirling vanes or tip and nozzle geometry for a specific application, or repositioning the inner shell longitudinally relative to the intermediate shell, to provide for the desired area coverage, heating, melting and the like.

Although the present invention has been described by reference to only a single embodiment thereof, it will be apparent that numerous modifications and embodiments will be devised by those skilled in the art which will fall within the true spirit and scope of the present invention.

What is claimed as new and desired to be secured by Letters Patent of the United States is:

1. A method for burning large volumes of liquid fuel comprising the steps of spraying said liquid fuel in streams from the end of a nozzle, and intersecting said streams with a continuous swirling annular flow of oxidizing and atomizing gas in sufficient volume to provide a stoichiometric volume of gas and at the same time to atomize the liquid fuel wherein said streams of liquid fuel are directed outwardly at an angle in the range of 10° to 60° from the axis of flow, and said annular flow of gas intersects said streams at an angle in the range of 45° to 90°.

2. A method as set forth in claim 1 and further comprising the step of cooling the nozzle by swirling a coolant in heat exchange relation to the nozzle.

3. The method as set forth in claim 1 and further comprising the step of deflecting the oxidizing and atomizing gas flow inwardly toward the stream of liquid fuel.

References Cited

UNITED STATES PATENTS

| | | | |
|---|---|---|---|
| 3,321,139 | 5/1967 | De Saint Martin | 239—132.3 |
| 351,390 | 10/1886 | Mitchell | 239—406 |
| 1,352,351 | 9/1920 | Byers | 239—406 |
| 3,412,986 | 11/1968 | Shepherd et al. | 239—132.3 X |

LLOYD L. KING, Primary Examiner

U.S. Cl. X.R.

239—132.3, 406